(12) United States Patent
Akolkar et al.

(10) Patent No.: US 8,447,786 B2
(45) Date of Patent: May 21, 2013

(54) LANGUAGE EXTENSIONS FOR CREATING, ACCESSING, QUERYING AND UPDATING RDF DATA

(75) Inventors: Rahul P. Akolkar, Tuckahoe, NY (US); Bruce David Lucas, Mohegan Lake, NY (US); Charles F. Wiecha, Hastings-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 12/243,161

(22) Filed: Oct. 1, 2008

(65) Prior Publication Data

US 2010/0082651 A1 Apr. 1, 2010

(51) Int. Cl.
*G06F 7/00* (2006.01)
*G06F 17/30* (2006.01)

(52) U.S. Cl.
USPC .......................................... 707/798; 707/807

(58) Field of Classification Search
None
See application file for complete search history.

(56) References Cited

U.S. PATENT DOCUMENTS

| 6,857,124 | B1 * | 2/2005 | Doyle | 719/316 |
|---|---|---|---|---|
| 2005/0060287 | A1 * | 3/2005 | Hellman et al. | 707/2 |
| 2006/0235823 | A1 * | 10/2006 | Chong et al. | 707/1 |
| 2006/0265508 | A1 * | 11/2006 | Angel et al. | 709/230 |
| 2006/0271506 | A1 * | 11/2006 | Bohannon et al. | 707/2 |
| 2008/0027981 | A1 * | 1/2008 | Wahl | 707/103 R |
| 2008/0126397 | A1 * | 5/2008 | Alexander et al. | 707/102 |
| 2009/0300656 | A1 * | 12/2009 | Bosworth et al. | 719/320 |
| 2010/0036788 | A1 * | 2/2010 | Wu et al. | 706/47 |

* cited by examiner

*Primary Examiner* — Pierre Vital
*Assistant Examiner* — Berhanu Mitiku
(74) *Attorney, Agent, or Firm* — Tutunjian & Bitetto, P.C.; Louis Percello

(57) ABSTRACT

A method for processing a graph structure includes providing a graph as a set of triples, each triple having a subject node, a predicate, and an object node, the predicate defining a relationship between a respective subject node and an object node. One of more triples in the set of triples are processed according to one or more attributes of each triple in the set of triples to permit accessing, querying, creating, and updating resource description framework (RDF) data structures in at least one of a script language and an object oriented language by providing a set of language extensions.

18 Claims, 2 Drawing Sheets

LANGUAGE EXTENSIONS FOR CREATING, ACCESSING, QUERYING AND UPDATING RDF DATA

BACKGROUND

1. Technical Field

The present invention relates to data structures and more particularly to mechanisms for extending languages to provide compatibility with resource description framework (RDF) data.

2. Description of the Related Art

Resource Description Framework (RDF) is a family of World Wide Web Consortium (W3C) specifications, originally designed as a metadata data model, which has come to be used as a general method of modeling information through a variety of syntax formats. The RDF metadata model is based upon the idea of making statements about Web resources in the form of subject-predicate-object expressions, called triples in RDF terminology. The subject denotes the resource, and the predicate denotes traits or aspects of the resource and expresses a relationship between the subject and the object. For example, one way to represent the notion "The fox is the color red" in RDF is as the triple: a subject denoting "the fox", a predicate denoting "is the color", and an object denoting "red". RDF is an abstract model with several serialization formats (i.e., file formats), and so the particular way in which a resource or triple is encoded varies from format to format.

The mechanism for describing resources is an evolutionary stage of the World Wide Web in which automated software can store, exchange, and use machine-readable information distributed throughout the Web, in turn enabling users to deal with the information with greater efficiency and certainty. RDF's simple data model and ability to model disparate, abstract concepts has also led to its increasing use in knowledge management applications unrelated to Semantic Web activity.

RDF is an increasingly popular data and knowledge representation language. It is highly flexible, relatively low-level, and fundamentally distributed, which makes it suitable for representing a wide range of data on the web. However, while the RDF data model may be used as the basis for a complete programming model, this is possible only if the programming model has a set of features that provide simple, easy to use access to underlying RDF data.

The subject of an RDF statement is a resource, possibly as named by a Uniform Resource Identifier (URI). Some resources are unnamed and are called blank nodes or anonymous resources. They are not directly identifiable. The predicate is a resource as well, representing a relationship. The object is a resource. A Uniform Resource Locator (URL) is a URI that in addition to identifying a resource, provides a way of locating the resource by describing its primary access mechanism (e.g., its network 'location'). It is necessary for producers and consumers of RDF statements to be in agreement on the semantics of resource identifiers. Such agreement is not inherent to RDF itself.

Despite the advantages of using RDF, many languages cannot make use of RDF or aspects of RDF. For example, ECMAScript and language features used in programming browsers encounter problems. For example, JavaScript, ECMAScript, cannot be used conveniently with RDF graph structures. ECMAScript, E4X and JavaScript, cannot be used for distributed RDF data structures. Object oriented languages cannot conveniently use distributed RDF data structures on the web. (Note ECMA International published the ECMA-357 standard, defining an extension to ECMAScript, known as E4X (ECMAScript for XML).

SUMMARY

A method for processing a graph structure includes providing a graph as a set of triples, each triple having a subject node, a predicate, and an object node, the predicate defining a relationship between a respective subject node and an object node. One of more triples in the set of triples are processed according to one or more attributes of each triple in the set of triples to permit accessing, querying, creating, and updating resource description framework (RDF) data structures in at least one of a script language and an object oriented language by providing a set of language extensions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
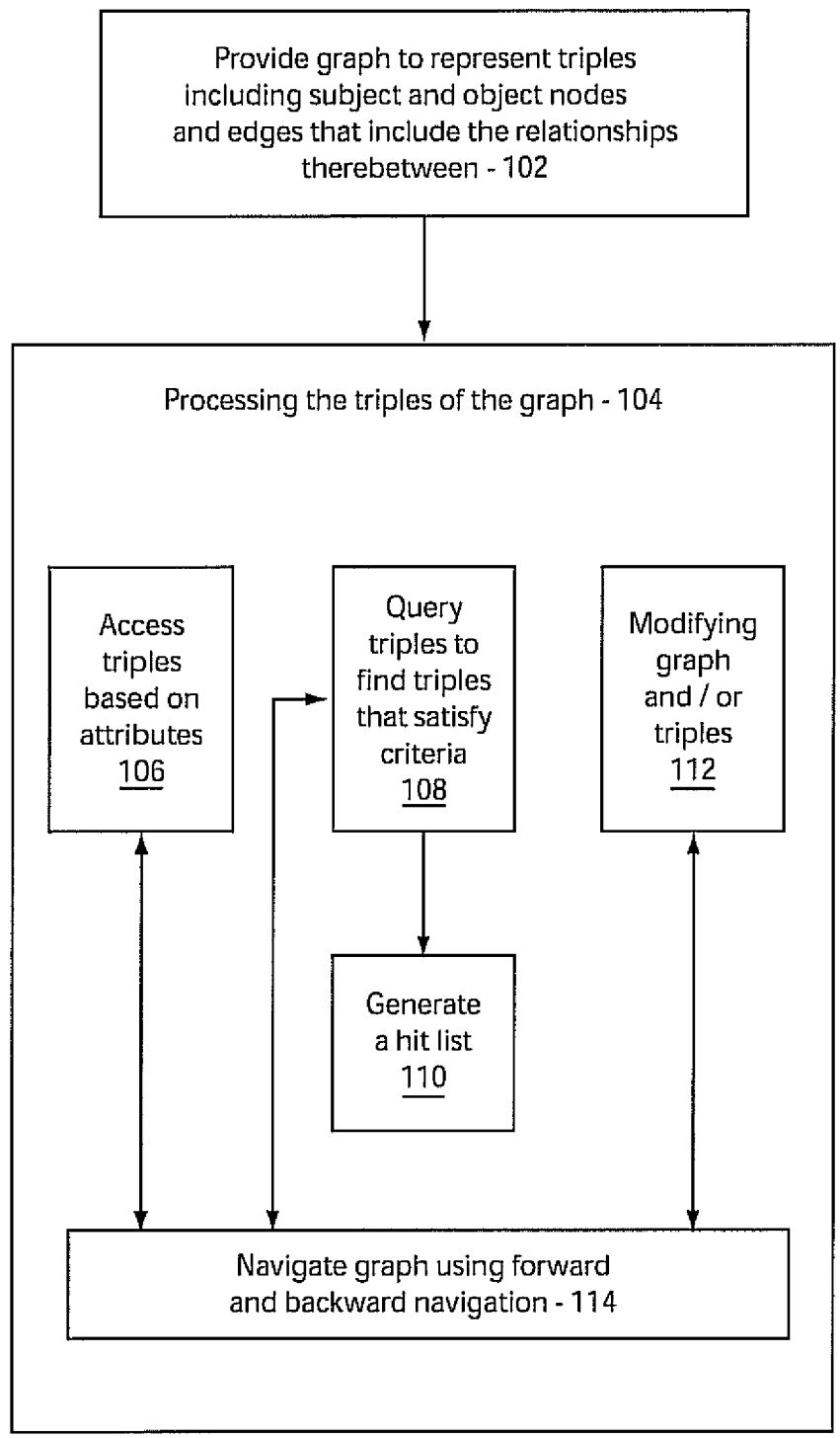
FIG. 1 is a block/flow diagram showing a system/method for creating, accessing, querying and updating RDF data in accordance with the present principles.

The present principles provide a set of language extensions to ECMAScript for accessing, querying, creating, and updating resource description framework (RDF) data structures. The language features are based on existing E4X ECMAScript language features for accessing, querying, creating, and updating XML data structures. In this disclosure, for ease of reference, we refer to the ECMAScript language features for accessing RDF data as E4R in accordance with the present principles. E4R enriches ECMAScript with easy native access to RDF data in environments where Javascript or ECMAScript are used. E4R provides a user-friendly query language for RDF data, and allows RDF data to be accessed using familiar path-oriented navigation expressions.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

RDF resource nodes: E4R introduces into ECMAScript a new object class for representing RDF resource nodes. Since each RDF resource node is uniquely identified by a uniform resource identifier (URI), an E4R RDF class object is essentially a wrapper for a URI. The E4R RDF class object type provides various constructors, access functions, and comparison operators. The following examples provide syntax for providing these features in programming code.

new RDF(uri) creates a new E4R RDF class object representing the RDF resource node with the specified URI.

new RDF( ) creates a new "blank" E4R RDF class object representing an RDF resource node with a unique anonymous URI.

rdf.uri( ) returns the URI of the RDF resource node represented by an E4R RDF class object.

rdf1==rdf2 returns true iff the variables rdf1 and rdf2 refer to two E4R RDF objects that represent the same RDF resource node.

Accessing RDF data:

Note: the term "object" is used in ECMAScript to refer a dynamically allocated data item of a particular class, and in RDF to refer to the third item in an RDF triple (the first item being the subject and the second item being the predicate, or property). In the interest of precision, the following text will use "E4R RDF class object" to refer to an object in the ECMAScript sense, and "RDF triple object" to refer to object in the RDF sense.

E4R permits the application developer to access RDF triples using a consistent path-oriented traversal mechanism. If x is a variable whose value is an E4R RDF class object, then the expression x.p accesses RDF triples whose RDF triple subject is the RDF resource node represented by x, and whose predicate is p. The result of the expression x.p is a list of E4R RDF class objects representing all RDF resource nodes that are the RDF triple objects of such triples. Thus, the expression x.p is in effect the result of an RDF query of the form [x.uri( ) p ?].

To represent the list that results from the evaluation of an expression such as x.p, E4R introduces an ECMAScript object type for representing a list of E4R RDF class objects. In ECMAScript the following expressions are equivalent: x.p; x["p"].

Consistent with this, E4R also permits RDF data to be accessed using either method. Since p is a URI, and in general the lexical range of URIs is different from the lexical range of ECMAScript identifiers, the x["p"] representation may be necessary in some cases.

RDF supports a namespace-based abbreviation for URIs: if pfx is a namespace prefix name bound to a uri u, then pfx:ln is equivalent to the URI formed by concatenating the uri u and the string ln. E4R supports this abbreviation mechanism as well for property URIs, using the syntax x.pfx::ln.

E4R supports "reverse navigation", that is, path expressions that traverse RDF triples from RDF triple object to RDF triple subject. This is done using a syntactic extension to ECMAScript, such as one of the following: x.^p or x.p$.

These expressions access RDF triples whose RDF triple object is the RDF resource node represented by x, and whose RDF triple predicate is p. The result of the expression x.p is a list of E4R RDF class objects representing all RDF resource nodes that are the RDF triple subject of such RDF triples. Thus, the expression x.^p or x.p$ is in effect the result of an RDF query of the form [? p x.uri( )].

E4R allows the use of multi-step paths, such as "x.p.q". This expression returns the list of E4R RDF class objects obtained by starting at RDF, node x, navigating through RDF triples whose property is p, and then through RDF triples whose property is q. The result is in effect the result of an RDF query [x.uri( ) p ?r] [?r q ?]. Multi-step paths may involve both forward navigation as in this example, or backward navigation, or both, as in for example x.^p.q.

Querying RDF data: E4R provides a way for querying RDF data, that is, for finding all RDF resources that meet a specified condition. E4R queries are based on filters, and take the form expr.(filter). The expr expression includes a value that is an E4R RDF class object or list of objects. It may be a simple variable whose value is an E4R RDF class object or list, a path expression as described above, or it may itself be a filter expression.

The filter expression is evaluated once for each E4R RDF class object in the value of the expr expression, using that value as the context for the filter execution. That value is included in the expression result list if and only if the value of the filter expression is true.

So for example consider the following set of RDF triples:

[r1 p r2]
[r2 q r3]
[r2 q r4]
[r3 n "1"]
[r3 w "one"]
[r4 n "2"]
[r4 w "two"].

Then, the value of:

$r=\text{new } RDF(\text{``}r1\text{''})$ $r.p.q.(n==\text{``}1\text{''})$ is a list including RDF class objects for the single RDF node r3, and the value of:

$r=\text{new } RDF(\text{``}r1\text{''})$ $r.p.q.(n==\text{``}1\text{''}).w$ is a list including the single string "one".

Updating RDF data: A path expression such as x.p is an l value, meaning that it may appear on the left hand side of an assignment statement. An assignment such as x.p=expr is meaningful if expr evaluates to a single RDF class object, a single string, or a list of RDF class objects and strings. The effect of such an assignment is to replace all triples of the form

[x p ?] with new triples of the same form, whose RDF objects are the RDF class objects or strings in the value on the right hand side of the assignment.

Similarly, the expressions x.p+=expr; x.p−=expr respectively add to and delete from the set of triples of the form [x p ?]. For example, consider the following set of RDF triples [r1 p r2] and the following ECMAScript variable assignments r1=new RDF("r1") r2=new RDF("r2") r3=new RDF("r3").

Then, a) after the execution of the statement r1.p=r3 the triple store includes [r1 p r3], b) after the execution of the statement r1.p+=r3 the triple store includes [r1 p r2] [r1 p r3], c) after the execution of the statements: r1.p+=r3
r1.p−=r2,
the triple store contains [r1 p r3].

Constructing RDF data: The RDF class object constructors and update mechanisms described above provide ways of constructing RDF data structures. It is also desirable to provide an abbreviated syntax. This may be modeled on the ECHAScript built-in object construction syntax, but using a special syntax such as, e.g. "[[ ]]" a delimiter to denote specifically the construction of E4R RDF class objects is provided.

An expression of the form:

```
[[
p: expr
...
]]
```

This expression creates a new anonymous RDF node, which we will suppose has the URI r1. It also creates a set of triples, one for each RDF node in the value of expr, of the form [r p ?] where ? is one of the values from expr. In such expressions, any property p may be repeated as many times as desired. In addition, the expr may itself be such a construction expression. So, for example, the expression:

```
[[
  p: [[
    q: "1"
    w: "2"
  ]]
  p: "3"
]]
``` creates the set of triples [r1 p r2] [r2 q "1"] [r2 w "2"] [r1 p "3"].

Referring now to the drawings in which like numerals represent the same or similar elements and initially to FIG. 1, a system/method for processing a graph structure is illustratively described in accordance with the present principles. In block 102, a graph is provided as a set of triples (See e.g., FIG. 2). Each triple preferably includes a subject node, a predict, and an object node. The triple defines a relationship between a respective subject node, object node and predicate. The nodes and edges represent features or aspects of tangible items. For example, the nodes may represent web pages and the graph may represent a network. In another example, the nodes may represent manufacturing centers which require resources to continue production. Many other configuration and systems may also benefits from the teachings in accordance with the present principles.

In block 104, the triples are processed. This may include one or more processing activities. The processing activities are enabled by providing a set of language extensions including an E4R RDF class object for a URI. The E4R RDF class object type provides at least one of constructors, access functions, and comparison operators for carrying out the processing functions. In this way, scripts and/or object oriented programs may be translated or enabled for convenient use with RDF data structures and processing. In block 106, one of more triples in the set of triples are accessed according to one or more attributes of each triple in the set of triples. The attributes may include at least one of a subject node type, a predicate node type, and a relationship. The types may be based on the types of web pages where the subject and predicate may respectively include an information resource and a consumer of that resource and the relationship therebetween. In another example, the resources and consumers may be within a same, single program.

In block 108, the graph can be queried to find triples meeting queried criteria. The querying may be considered a form of accessing. The query preferably may include one or more of a path subquery and a filter subquery. The query may be specified in RDF. In block 110, a hit list may be generated based on the query.

In block 112, the graph may be modified by updating triples using, e.g., assignment expressions.

In block 114, the graph may be navigated based upon path expressions. Navigating includes forward and backward navigating, and is employed for any of the processing activities, such as creating, accessing, querying, and updating triples data.

Figure 2:
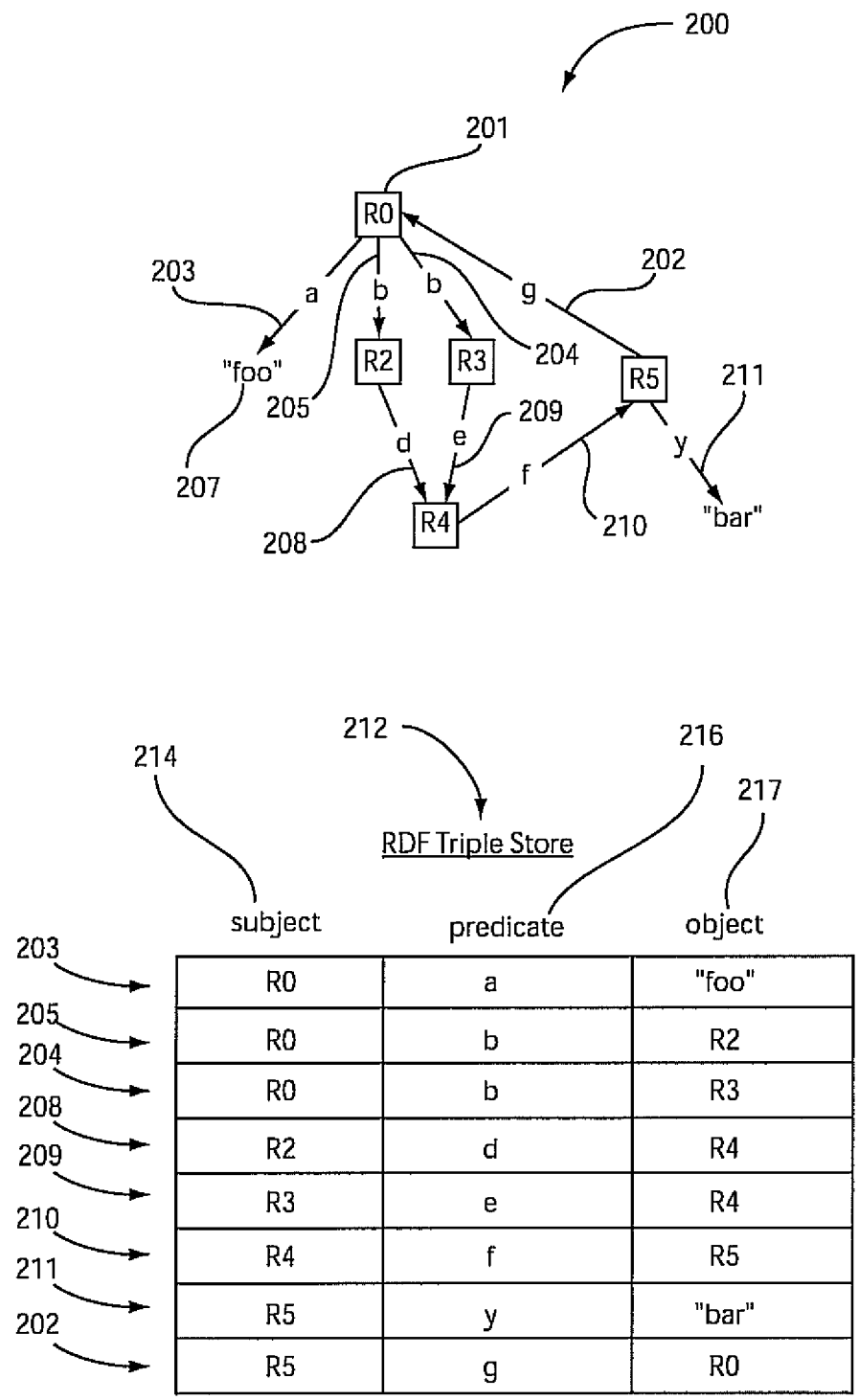
FIG. 2 is a graph showing an RDF graph and triple store table creating, accessing, querying and updating RDF data in accordance with the present principles.

Referring to FIG. 2, an RDE data graph 200 is illustratively shown which may be processed with language extensions so that the RDF data structures may be employed with scripts, object oriented programs and other programs/languages not normally capable of employing REF data structures and processing. A table 212 shows a set of RDF triples (associated with edges) represented by the graph 200. A node 201 represents a resource identified by a URI R0. This node 201 appears as the subject or object of a number of triples, indicated by edges (lines) connected to the node 201 in the graph 200 (such as edges 202, 203, 204 and 205), or by the corresponding triple entries 202, 203, 204 and 205 in the table 212.

An edge such as 202 pointing towards the node R0 indicates a triple with R0 as the object 217 of the triple. The triple indicated by 202 has R5 as its subject 214, and g as its predicate 216.

Edge 203 pointing away from the node R0 indicates a triple 203 with R0 as the subject 214 of the triple, a as its predicate 216, and the literal "foo" as its object 217. The object of a triple may be either a node with a URI such as R0, or a string literal such as "foo".

Having described preferred embodiments for systems and methods for language extensions for creating, accessing, querying, and updating RDEF data (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for processing a graph structure, comprising:
providing a graph as a set of triples, each triple having a resource description framework (RDF) subject node, an RDF predicate, and an RDF object node, the predicate defining a relationship between a the respective RDF subject node and the RDF object node; and providing a set of language extensions to at least one of a script language and an object oriented language that provide native access to the graph in the extended language, where said language extensions process one of more triples in the set of triples according to one or more attributes of each triple in the set of triples to permit accessing, querying, creating, and updating triples on the graph using at least one of constructors, access functions, and comparison operators to natively handle RDF data, wherein said processing includes applying a query to the set of triples, specified in RDF, that includes a path subquery and a filter subquery.

2. The method as recited in claim 1, wherein the attributes include node types and relationships.

3. The method as recited in claim 1, further comprising generating a hit list based on applying the query.

4. The method as recited in claim 1, further comprising navigating the graph based upon path expressions.

5. The method as recited in claim 4, wherein navigating includes forward and backward navigating.

6. The method as recited in claim 1, further comprising modifying the graph by updating triples using assignment expressions.

7. The method as recited in claim 1, wherein the graph represents a web network wherein each node includes a web page.

8. The method as recited in claim 1, wherein the script language includes at least one of ECMAScript, ECMAScript for XML (E4X) and JavaScript.

9. The method as recited in claim 1, wherein providing a set of language extensions includes providing an ECMAScript for RDF (E4R) RDF class object for a uniform resource identifier (URI).

10. A non-transitory computer readable storage medium comprising a computer readable program for processing a graph structure, wherein the computer readable program when executed on a computer causes the computer to perform the steps of:

providing a graph as a set of triples, each triple having a resource description framework (RDF) subject node, an RDF predicate, and an RDF object node, the predicate defining a relationship between a the respective RDF subject node and the RDF object node; and providing a set of language extensions to at least one of a script language and an object oriented language that provide native access to the graph in the extended language, where said language extensions process one of more triples in the set of triples according to one or more attributes of each triple in the set of triples to permit accessing, querying, creating, and updating triples on the graph using at least one of constructors, access functions, and comparison operators to natively handle RDF data, wherein said processing includes applying a query to the set of triples, specified in RDF, that includes a path subquery and a filter subquery.

11. The computer readable storage medium as recited in claim 10, wherein the attributes include node types and relationships.

12. The computer readable storage medium as recited in claim 10, further comprising generating a hit list based on applying the query.

13. The computer readable storage medium as recited in claim 10, further comprising navigating the graph based upon path expressions.

14. The computer readable storage medium as recited in claim 13, wherein navigating includes forward and backward navigating.

15. The computer readable storage medium as recited in claim 10, further comprising modifying the graph by updating triples using assignment expressions.

16. The computer readable storage medium as recited in claim 10, wherein the graph represents a web network wherein each node includes a web page.

17. The computer readable storage medium as recited in claim 10, wherein the script language includes at least one of ECMAScript, ECMAScript for XML (E4X) and JavaScript.

18. The computer readable storage medium as recited in claim 10, wherein providing a set of language extensions includes providing an ECMAScript for RDF (E4R) RDF class object for a uniform resource identifier (URI).

\* \* \* \* \*